(12) United States Patent  
Fujita et al.

(10) Patent No.: US 9,611,533 B2  
(45) Date of Patent: Apr. 4, 2017

(54) MANUFACTURING METHOD OF MACHINE COMPONENT

(75) Inventors: Takumi Fujita, Kuwana (JP); Kazuhiro Yagita, Kuwana (JP)

(73) Assignee: NTN CORPORATION, Osaka (JP)

( * ) Notice: Subject to any disclaimer, the term of this patent is extended or adjusted under 35 U.S.C. 154(b) by 398 days.

(21) Appl. No.: 14/113,573

(22) PCT Filed: Apr. 25, 2012

(86) PCT No.: PCT/JP2012/061061  
§ 371 (c)(1), (2), (4) Date: Oct. 23, 2013

(87) PCT Pub. No.: WO2012/147776  
PCT Pub. Date: Nov. 1, 2012

(65) Prior Publication Data  
US 2014/0048179 A1    Feb. 20, 2014

(30) Foreign Application Priority Data

Apr. 26, 2011   (JP) ................................. 2011-098274  
Apr. 24, 2012   (JP) ................................. 2012-098661

(51) Int. Cl.  
*C23C 8/34*   (2006.01)  
*C21D 1/76*   (2006.01)  
(Continued)

(52) U.S. Cl.  
CPC ................. *C23C 8/34* (2013.01); *C21D 1/06* (2013.01); *C21D 1/76* (2013.01); *C21D 9/40* (2013.01);  
(Continued)

(58) Field of Classification Search  
CPC .... C21D 9/40; C21D 1/06; C21D 1/76; C23C 8/02; C23C 8/32; C23C 8/34; C23C 8/80  
See application file for complete search history.

(56) References Cited

U.S. PATENT DOCUMENTS 5,085,733 A * 2/1992 Mitamura ............... C22C 38/18  
148/319  
2007/0099012 A1   5/2007 Brady et al.  
2012/0020605 A1   1/2012 Mori

FOREIGN PATENT DOCUMENTS

CN   101855370 A   10/2010  
EP   1486586 A1   12/2004  
(Continued)

OTHER PUBLICATIONS

Bates et al., (ASM International Handbook Committee), ASM Handbook vol. 04: Heat Treating-Quenching of Steel., 1991, ASM International, pp. 67-90.*

(Continued)

*Primary Examiner* — Roy King  
*Assistant Examiner* — Jophy S Koshy  
(74) *Attorney, Agent, or Firm* — McDermott Will & Emery LLP

(57) ABSTRACT

A method of manufacturing a machine component includes the steps of: preparing a member made of steel; forming a film containing vanadium at a surface by subjecting the member to oxidation; and forming a nitrogen-enriched layer by heating the member having the film formed in a heat treatment gas atmosphere containing nitrogen gas and absent of ammonia gas for carbonitriding.

9 Claims, 8 Drawing Sheets

(51) Int. Cl.
      *C21D 9/40*       (2006.01)
      *C23C 8/32*       (2006.01)
      *C21D 1/06*       (2006.01)
      *C23C 8/02*       (2006.01)
      *C23C 8/80*       (2006.01)
      *C23C 28/04*       (2006.01)
      *F16C 33/64*       (2006.01)

(52) U.S. Cl.
    CPC ............... *C23C 8/02* (2013.01); *C23C 8/32* (2013.01); *C23C 8/80* (2013.01); *C23C 28/042* (2013.01); *F16C 33/64* (2013.01)

(56) References Cited

FOREIGN PATENT DOCUMENTS

| EP | 2221389 A1 | 8/2010 |
|----|------------|--------|
| JP | 6-173967 A | 6/1994 |
| JP | 2004-292934 A | 10/2004 |
| JP | 2007-040503 A | 2/2007 |
| JP | 2010-222678 A | 10/2010 |

OTHER PUBLICATIONS

Chinese Office Action CN 201280019952.7 dated Dec. 22, 2014 with English translation.
International Search Report PCT/JP2012/061061 dated Jul. 3, 2012.
Mouri et al., "Improvement of Wear Resistance by Heat Treatment for Carburizing Steel", NTN Technical Review, No. 76, 2008, pp. 17-22 w/English language summary.
Supplementary European Search Report EP Application No. 12777157.4 dated Oct. 14, 2014.

\* cited by examiner

MANUFACTURING METHOD OF MACHINE COMPONENT

CLAIM TO CONVENTION PRIORITY

This application is the U.S. National Phase of PCT/JP2012/061061 filed Apr. 25, 2012, which claims priority from Japanese Patent Application No. 2011-098274 filed Apr. 26, 2011 and Japanese Patent Application No. 2012-098661 filed Apr. 24, 2012 each of which is incorporated in entirety by reference.

TECHNICAL FIELD

The present invention relates to a method of manufacturing a machine component, more particularly, a method of manufacturing a machine component having a nitrogen-enriched layer at a surface layer.

BACKGROUND ART

For the purpose of improving the fatigue strength and/or wear resistance of a machine component, a nitrogen-enriched layer having a high nitrogen concentration as compared to the interior may be formed at the surface layer of the machine component by means of carbonitriding or the like. In a general carbonitriding process, atmosphere gas is often used, which is based on producing carrier gas by mixing propane, butane or city gas with air at a high temperature greater than or equal to 1000° C. (endothermic converted gas: hereinafter, referred to RX gas) (RX is a trademark of Surface Combustion, Inc.), having a small amount of propane, butane, and ammonia added. By heating a workpiece in this atmosphere gas, a nitrogen-enriched layer is formed at the surface layer of the workpiece. During a carbonitriding process using RX gas as the carrier gas, a nitriding response occurs by undecomposed ammonia (for example, refer to "Improvement of Wear Resistance by Heat Treatment for Carburizing Steel" by Nobuyuki Mouri et al., NTN TECHNICAL REVIEW, 2008, No. 76, pp 17-22 (NONPATENT DOCUMENT 1)).

CITATION LIST

Non Patent Document

NPD 1: "Improvement of Wear Resistance by Heat Treatment for Carburizing Steel" by Nobuyuki Mouri et al., NTN TECHNICAL REVIEW, 2008, No. 76, pp 17-22

SUMMARY OF INVENTION

Technical Problem

Decomposition of ammonia gas generally proceeds as the temperature becomes higher. Therefore, the nitriding process by undecomposed ammonia is not often executed at a temperature region exceeding 900° C. As a result, it was difficult to increase the treatment temperature to shorten the carbonitriding time even in the case of treating a product that requires a thick nitride layer. There was a problem that the processing time is lengthened. The carbonitriding process using ammonia gas also had the problem that the facility maintenance management cost is increased due to the requirement of installing a facility to introduce ammonia gas into the heat treatment furnace and rapid consumption of components employed in the heat treatment furnace (for example, the basket for product transportation).

In view of the foregoing, an object of the present invention is to provide a machine component manufacturing method allowing a machine component having a nitrogen enriched layer at a surface layer to be manufactured by rapid heat treatment not using ammonia gas.

Solution to Problem

According to the present invention, a method of manufacturing a machine component includes the steps of: preparing a member made of steel, forming a film containing vanadium at a surface of the member, and forming a nitrogen-enriched layer by heating the member having the film formed in an atmosphere of heat treatment gas including nitrogen gas and absent of ammonia gas.

During various studies in association with heat treatment of steel, the inventors found out that, by forming a film containing vanadium at the surface of a member made of steel, followed by heating in an atmosphere including nitrogen gas, a nitrogen-enriched layer is formed at the surface layer of the member even if the atmosphere is absent of ammonia gas, thus conceiving of the present invention. In the method of manufacturing a machine component in the present invention, a member made of steel, having a film containing vanadium formed at the surface, is heated in an atmosphere including nitrogen gas and absent of ammonia gas, leading to formation of a nitrogen-enriched layer at the surface layer of the machine component. Since the formation of a nitrogen-enriched layer is not advanced by undecomposed ammonia in the present manufacturing method, heat treatment at a higher temperature is allowed. Accordingly, the period of time for heat treatment can be shortened. Moreover, since ammonia is not used in the manufacturing method, consumption of the components employed in the heat treatment furnace can be suppressed to reduce the facility maintenance management cost. According to the machine component manufacturing method of the present invention, a machine component having a nitrogen-enriched layer at a surface layer can be manufactured by rapid heat treatment not using ammonia gas.

As used herein, heat treatment gas absent of ammonia gas implies not including ammonia gas substantially, and does not exclude the mixture of ammonia gas at the impurity level.

In the method of manufacturing a machine component set forth above, the oxygen partial pressure of the heat treatment gas may be less than or equal to $10 \times 10^{-16}$ Pa. Accordingly, oxidation of the member made of steel is suppressed, facilitating the formation of a nitrogen-enriched layer.

In the method of manufacturing a machine component set forth above, the heat treatment gas may include reducing gas. Accordingly, oxidation of the member made of steel can be suppressed, facilitating the formation of a nitrogen-enriched layer.

In the method of manufacturing a machine component set forth above, the heat treatment gas may include nitrogen gas and hydrogen gas with residual impurities. Hydrogen gas is suitable as the reducing gas that suppresses oxidation of the member made of steel.

In the method of manufacturing a machine component set forth above, the step of preparing a member may have a member made of steel containing vanadium greater than or equal to 0.1 mass % prepared, and the step of forming a film may have a film formed by oxidation of the member.

In a machine component made of steel containing vanadium greater than or equal to 0.1 mass %, formation of a film containing vanadium can be facilitated by subjecting the member to oxidation. Accordingly, the formation of a nitrogen-enriched layer can be readily achieved.

In the step of forming a film in the method of manufacturing a machine component set forth above, the member may be heated at a temperature range greater than or equal to 800° C. to be oxidized. Accordingly, the formation of a film containing vanadium can be further facilitated.

In the step of forming a film in the method of manufacturing a machine component set forth above, the member may be forged. When the manufacturing process of a machine component includes a forging step, a film containing vanadium can be formed efficiently by subjecting the machine component to oxidation in the forging step.

In the step of forming a film in the method of manufacturing a machine component set forth above, the film may be formed by physical vapor deposition. Further, in the step of forming a film, the film may be formed by chemical vapor deposition. Further, in the step of forming a film, the film may be formed by wet coating. By such a method, a film containing vanadium can be readily formed.

In the method of manufacturing a machine component set forth above, the heat treatment gas may include endothermic converted gas. Accordingly, formation of a nitrogen-enriched layer can be achieved while readily adjusting the carbon potential in the atmosphere.

The method of manufacturing a machine component set forth above may further include the step of quench-hardening the member by cooling the member having a nitrogen-enriched layer formed from a temperature greater than or equal to $A_1$, a eutectoid transformation point (also known as a lower critical temperature), to a temperature less than or equal to a martensite start ("$M_S$" or "Ms") point. Accordingly, a machine component of high durability, having a nitrogen-enriched layer formed and quench-hardened, can be readily manufactured.

In the method of manufacturing a machine component set forth above, the machine component may be a component constituting a rolling bearing. A component such as a bearing ring and a rolling element constituting a rolling bearing often requires fatigue strength and wear resistance. Therefore, the method of manufacturing a machine component of the present invention is suitable for a method of manufacturing a component constituting a rolling bearing.

Advantageous Effects of Invention

According to the above description, there can be provided a method of manufacturing a machine component, allowing a machine component having a nitrogen-enriched layer at a surface layer to be manufactured by rapid heat treatment not using ammonia gas.

DESCRIPTION OF EMBODIMENTS

Figure 1:
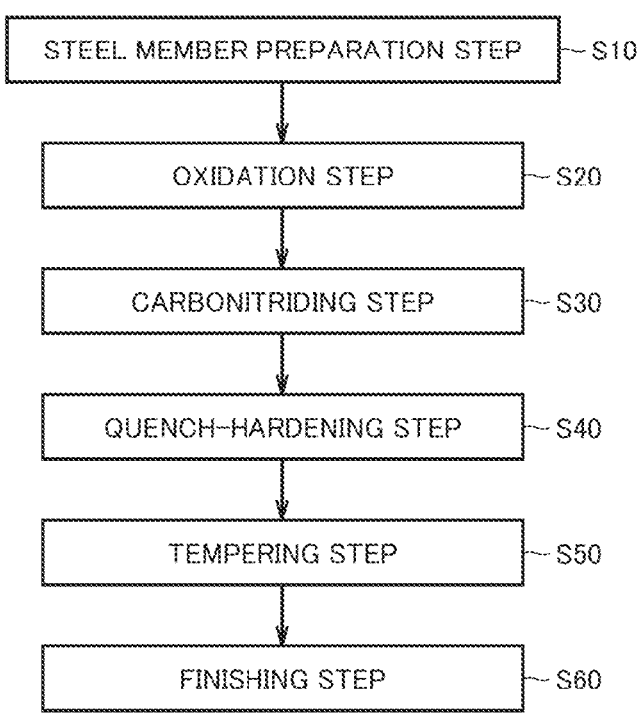
FIG. 1 is a flowchart to describe an example of a method of manufacturing a machine component according to the present invention.

Embodiments of the present invention will be described hereinafter with reference to the drawings. In the drawings, the same or corresponding elements have the same reference characters allotted, and description thereof will not be repeated.

(First Embodiment)

A first embodiment that is one embodiment of the present invention will be described. Referring to FIG. 1, in a method of manufacturing a machine component according to the first embodiment, a steel member preparation step is performed as step S10. At step S10, a steel member that is a member made of steel and formed in substantially the shape of a machine component is prepared. Specifically, a steel material of AMS2315 that is steel containing vanadium greater than or equal to 0.1 mass %, for example, is prepared, subjected to working such as forging, grinding, and the like to produce a steel member.

Then, an oxidation step is performed as step S20. At step S20, the steel member prepared at step S10 is subjected to oxidation. Specifically, the steel member is heated at a temperature range greater than or equal to 800° C. in the air, whereby the surface layer of the steel member is oxidized. At this stage, the reaction of vanadium in the steel with carbon in the steel and nitrogen in the atmosphere causes a film containing vanadium to be formed at the surface of the steel member. Specifically, this film is a V (vanadium)—N (nitrogen) film, a V—C (carbon) film, a V—C—N film, or the like.

Then, a carbonitriding step is performed as step S30. At step S30, the steel member subjected to oxidation at step S20 is subjected to carbonitriding. Specifically, in an atmosphere adjusted to the desired carbon potential by adding propane gas or the like as enrich gas into RX gas that is endothermic converted gas obtained by mixing propane gas and air in a reforming furnace and heating to a temperature greater than or equal to 1000° C. under the presence of a catalyst, the steel member is heated at a temperature range greater than or equal to $A_1$ transformation point. At this stage, ammonia gas is not added to the atmosphere. Accordingly, carbon invades the surface layer of the steel member. Since the surface of the steel member has a film containing vanadium formed at step S20 and the nitrogen gas in the air is included in the RX gas, also nitrogen invades the surface layer of the steel member. As a result, the steel member is carbonitrided, forming a nitrogen-enriched layer at the surface layer of the steel member.

Here, the oxygen partial pressure of the heat treatment gas (atmosphere gas) is preferably less than or equal to $10 \times 10^{-16}$ Pa. Accordingly, oxidation of the steel member is suppressed and formation of a nitrogen-enriched layer can be facilitated. The heat treatment gas is not limited to RX gas having enrich gas added, and may be any gas containing nitrogen and that suppresses oxidation of the steel member by including reducing gas, for example. For the reducing gas, hydrogen gas, carbon monoxide gas, or the like may be employed. More specifically, alternative to the RX gas having enrich gas added, the heat treatment gas may include nitrogen gas and hydrogen gas with residual impurities. In this case, the ratio of the hydrogen gas may be approximately 50 volume %. Even a ratio of approximately 2 volume % thereof allows sufficient formation of a nitrogen-enriched layer. From the standpoint of ensuring sufficient formation of a nitrogen-enriched layer while reducing hydrogen gas that is combustible gas, the hydrogen content can be set to, for example, greater than or equal to 2 volume % and less than or equal to 30 volume %.

Then, a quench-hardening step is performed as step S40. At step S40, the steel member subjected to carbonitriding at step S30 is quench-hardened. Specifically, the steel member subjected to carbonitriding at the temperature range greater than or equal to $A_1$ transformation point at step S30 is quench-hardened by being cooled down to the temperature range less than or equal to $M_S$ point from the temperature range greater than or equal to $A_1$ transformation point. Accordingly, the entire steel member including the nitrogen-enriched layer is quench-hardened, thus applying high fatigue strength and wear resistance to the steel member.

Then, a tempering step is performed as step S50. At step S50, the steel member subjected to quench-hardening at step S40 is tempered. Specifically, at step S50, the steel member subjected to quench-hardening at step S40 is heated to a temperature less than or equal to $A_1$ transformation point, and then cooled for the tempering process.

Then, a finishing step is performed as step S60. At step S60, the steel member obtained by performing steps S10-S50 is subjected to a finishing work to complete a machine component such as a bearing component. Specifically, at step S60, the tempered steel member is polished and the like for the completion of a machine component. By the process set forth above, the method of manufacturing a machine component of the present embodiment is completed to produce a completed machine component.

In the method of manufacturing a machine component of the present embodiment, a steel member having a film containing vanadium formed at the surface is heated in an atmosphere containing nitrogen gas and absent of ammonia gas to manufacture a machine component having a nitrogen-enriched layer. In the method of manufacturing a machine component of the present embodiment, the formation of a nitrogen-enriched layer is not advanced by undecomposed ammonia. Therefore, heat treatment at high temperature is allowed without having to take into account the decomposition of ammonia. As a result, in the method of manufacturing a machine component of the present embodiment, the process of forming a nitrogen-enriched layer is performed at high temperature, allowing the period of time for the heat treatment to be shortened. Furthermore, since ammonia is not used in the manufacturing method, consumption of components employed in the heat treatment furnace is suppressed to allow the facility maintenance management cost to be reduced. Thus, according to the method of manufacturing a machine component of the present embodiment, a machine component having a nitrogen-enriched layer at the surface layer can be manufactured by rapid heat treatment not using ammonia gas.

(Second Embodiment)

Figure 2:
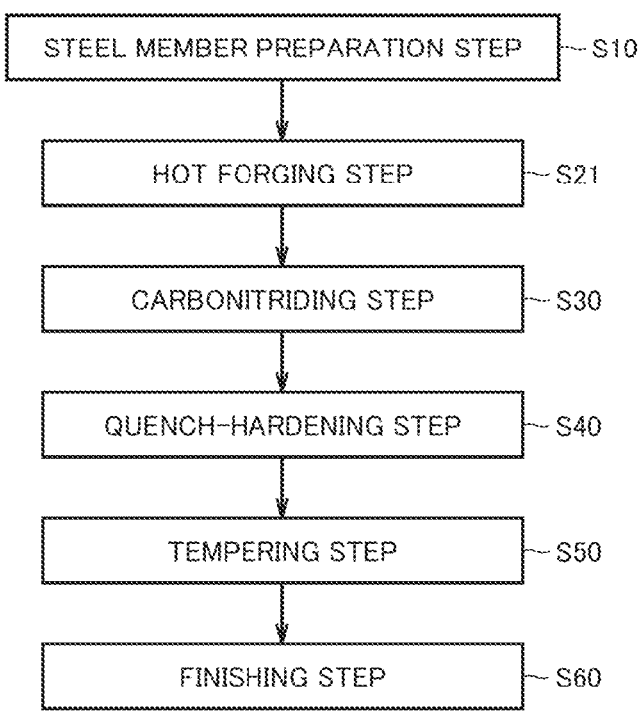
FIG. 2 is a flowchart to describe another example of a method of manufacturing a machine component according to the present invention.

A second embodiment that is another embodiment of the present invention will be described hereinafter with reference to FIG. 2. The method of manufacturing a machine component according to the second embodiment is carried out in a manner basically similar to that of the first embodiment. However, the method of manufacturing a machine component of the second embodiment differs from that of the first embodiment in including a hot forging step.

In the method of manufacturing a machine component according to the second embodiment, steel containing vanadium greater than or equal to 0.1 mass % is prepared at step S10, likewise with the first embodiment. A steel member is produced by forming to a shape that allows hot forging in a step S21 that will be described below.

Next, a hot forging step is performed as step S21. At step S21, the steel member is hot forged. Specifically, the steel member is shaped by hot forging in the air, for example. At this stage, the surface layer of the steel member is oxidized by the oxygen in the air. As a result, the reaction of vanadium in the steel with the carbon in the steel and nitrogen in the atmosphere causes formation of a film containing vanadium at the surface of the steel member, specifically a V—N film, a V—C film, a V—C—N film, or the like.

Then, step S20 is skipped, and steps S30-S60 are performed, likewise with the first embodiment, to complete a machine component.

In the method of manufacturing a machine component of the present embodiment, oxidation of the steel member is performed taking advantage of the hot forging step in the manufacturing process. Therefore, the method of manufacturing a machine component of the present invention can be carried out while suppressing increase in the manufacturing steps.

(Third Embodiment)

Figure 3:
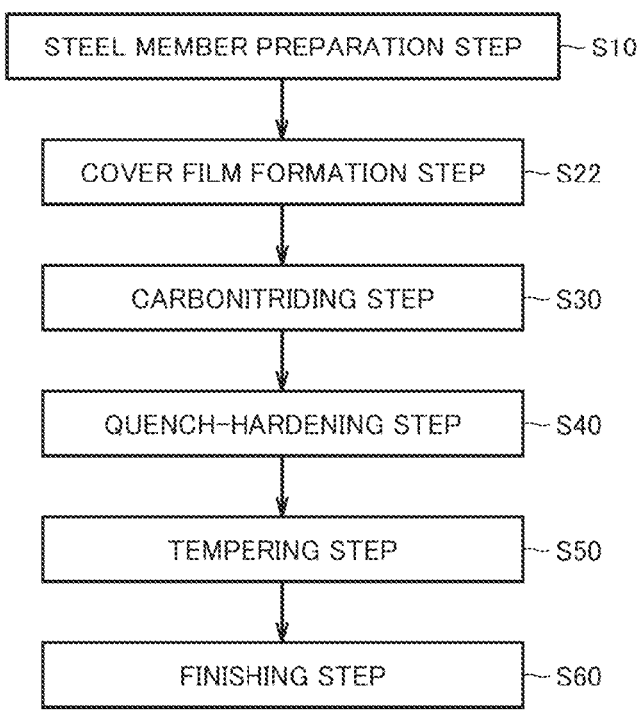
FIG. 3 is a flowchart to describe still another example of a method of manufacturing a machine component according to the present invention.
Figure 4:
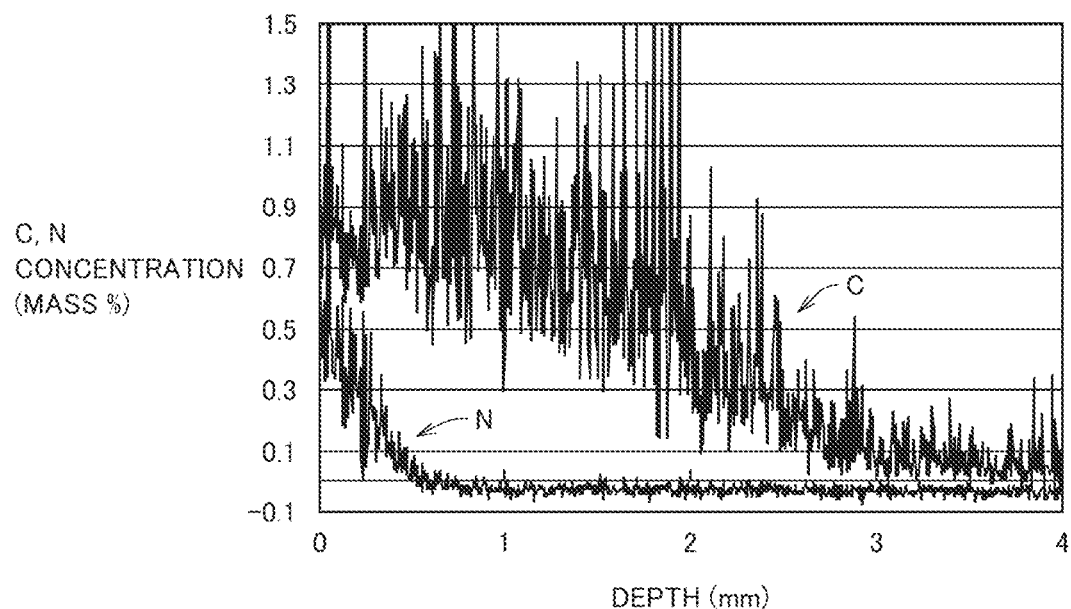
FIG. 4 represents the concentration distribution of carbon and nitrogen in the depth direction.
Figure 5:
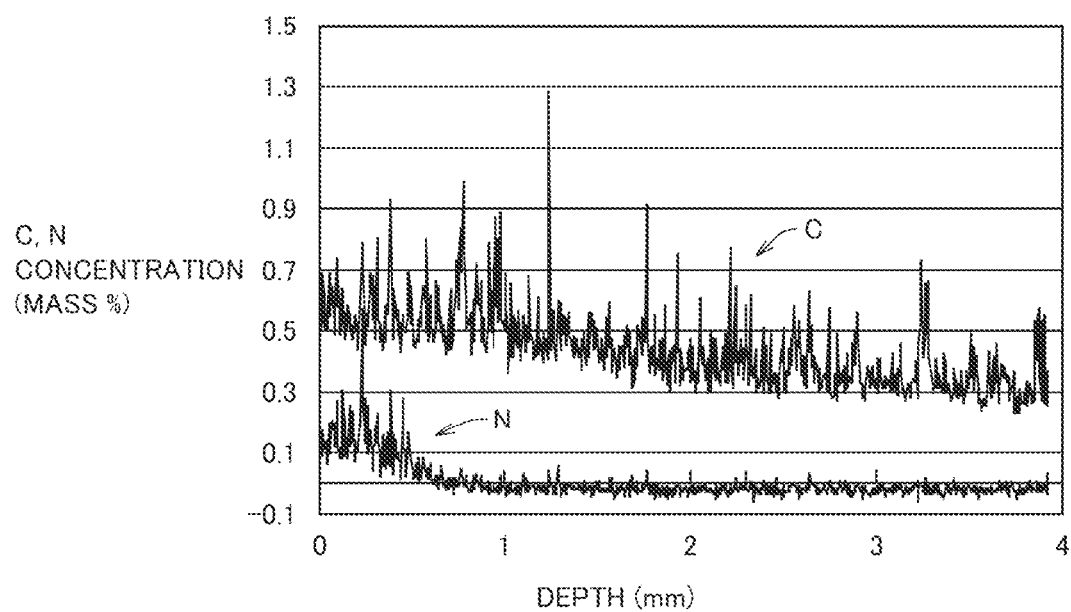
FIG. 5 represents the concentration distribution of carbon and nitrogen in the depth direction.
Figure 6:
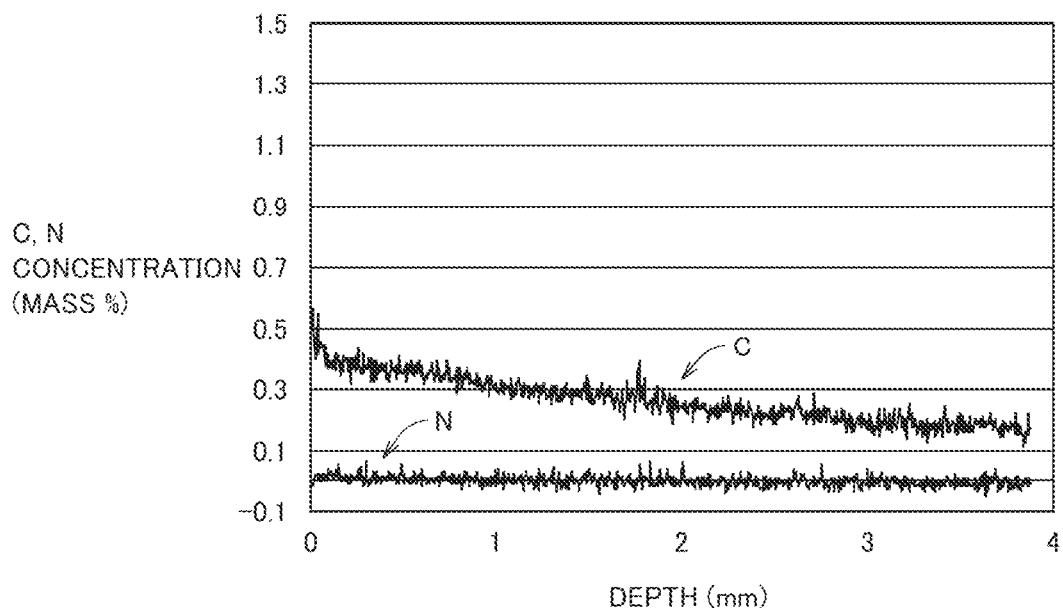
FIG. 6 represents the concentration distribution of carbon and nitrogen in the depth direction.
Figure 7:
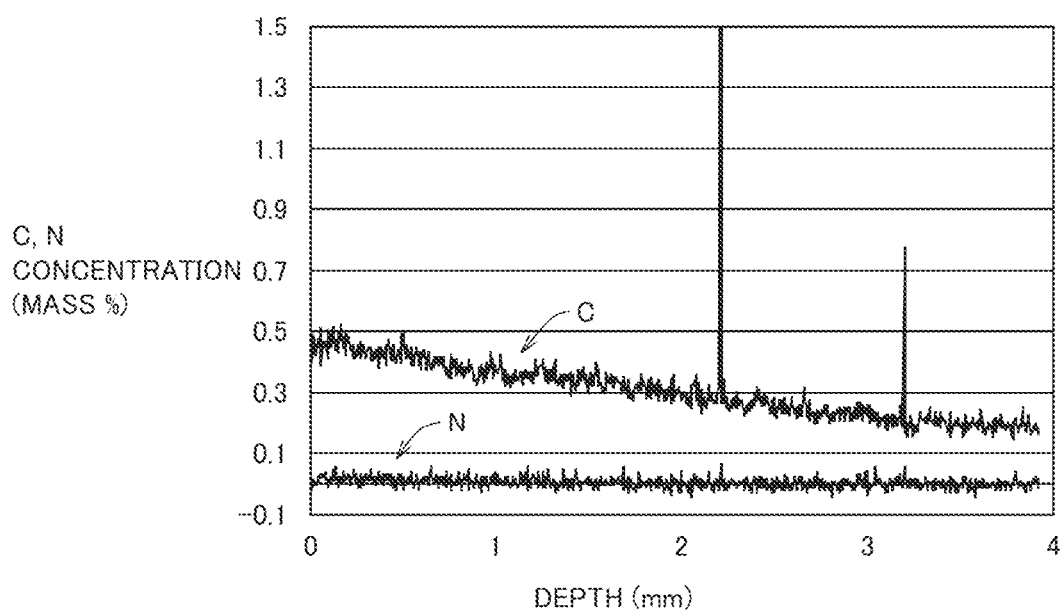
FIG. 7 represents the concentration distribution of carbon and nitrogen in the depth direction.

A third embodiment that is still another embodiment of the present invention will be described hereinafter with reference to FIG. 3. The method of manufacturing a machine component according to the third embodiment is carried out basically similar to that of the first embodiment. However, the method of manufacturing a machine component of the third embodiment differs from the first embodiment in the component composition of the steel member and formation of a film containing vanadium.

In the method of manufacturing a machine component of the third embodiment, steel is prepared at step S10, likewise with the first embodiment. This steel is worked to produce a steel member. At this stage, the steel does not have to contain vanadium greater than or equal to 0.1 mass % in the third embodiment. Carburized steel such as JIS SNCM420, SCN420 or the like (alloy steel for machinery construction) is employed as the base material.

Then, a cover film formation step is performed as step S22. At this step S22, a film containing vanadium is formed at the surface of the steel member. Specifically, by physical vapor deposition, chemical vapor deposition, wet coating, or the like, a film containing vanadium such as a V film, a V—N film, a V—C film, a V—C—N film, or the like is formed at the surface of the steel member. Then, steps S30-S60 are performed, likewise with the first embodiment, to complete a machine component.

In the method of manufacturing a machine component according to the present embodiment, a film containing vanadium is formed at the surface of the steel member by physical vapor deposition, chemical vapor deposition, wet coating, or the like. Therefore, the steel that is the base material does not have to contain vanadium greater than or equal to 0.1 mass %, so that various types of base material can be employed. As a result, according to the method of manufacturing a machine component in the present embodiment, a machine component superior in fatigue strength and wear resistance can be manufactured using economic steel that does not contain vanadium.

EXAMPLES

Example 1

Experiments were carried out to confirm that, by forming a film containing vanadium, formation of a nitrogen-enriched layer is allowed by heating in a heat treatment gas atmosphere absent of ammonia gas.

First, four types of steel having the component composition shown in Table 1 were prepared, from which test pieces were produced. In Table 1, the unit of the numeric values is mass %, and the residues in the composition set forth in the table are iron and impurities. Steel C and steel D did not have vanadium added, and include contents of impurity level. Steel A, Steel C and steel D correspond to AMS2315, JIS SNCM420, and JIS SCM 420, respectively.

TABLE 1

|  | C | Si | Mn | Cr | Mo | V |
|---|---|---|---|---|---|---|
| Steel A | 0.15 | 0.2 | 0.3 | 4 | 4 | 1.2 |
| Steel B | 0.15 | 0.2 | 0.6 | 1.5 | 1.2 | 0.4 |
| Steel C | 0.2 | 0.2 | 0.6 | 0.6 | 0.2 | — |
| Steel D | 0.2 | 0.2 | 0.6 | 1.1 | 0.2 | — |

Following an oxidation process by heating the produced test piece to a temperature greater than or equal 900° C. in the air, the test piece was heated to 960° C. in an RX gas atmosphere of carbon potential 0.6 and absent of ammonia gas for carburization. The concentration distribution of carbon and nitrogen in the depth direction for the test piece was examined. FIGS. 4, 5, 6 and 7 correspond to the test results of steel A, steel B, steel C, and steel D, respectively, in Table 1.

Referring to FIGS. 4-7, it was confirmed that formation of a nitrogen-enriched layer is allowed by steel A and steel B containing vanadium greater than or equal to 0.1 mass % by heating in an atmosphere absent of ammonia gas.

Figure 8:
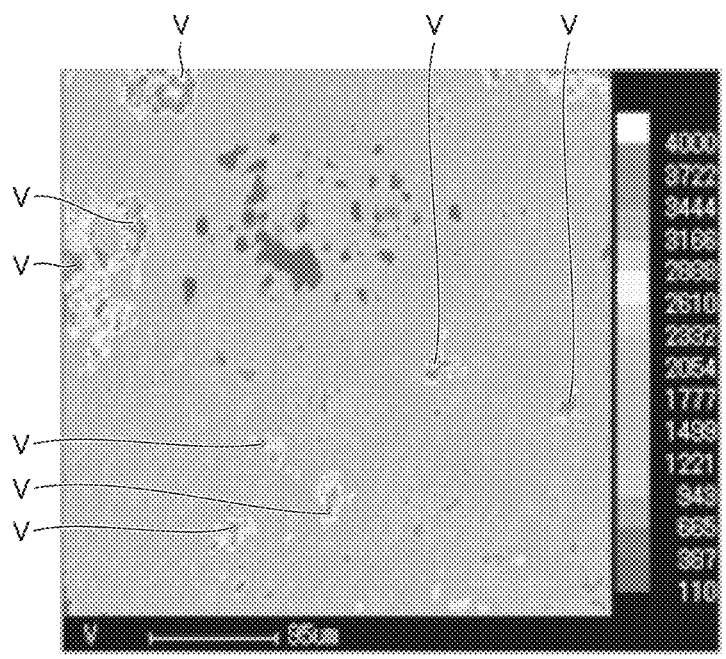
FIG. 8 represents the distribution of vanadium at a specimen surface.
Figure 9:
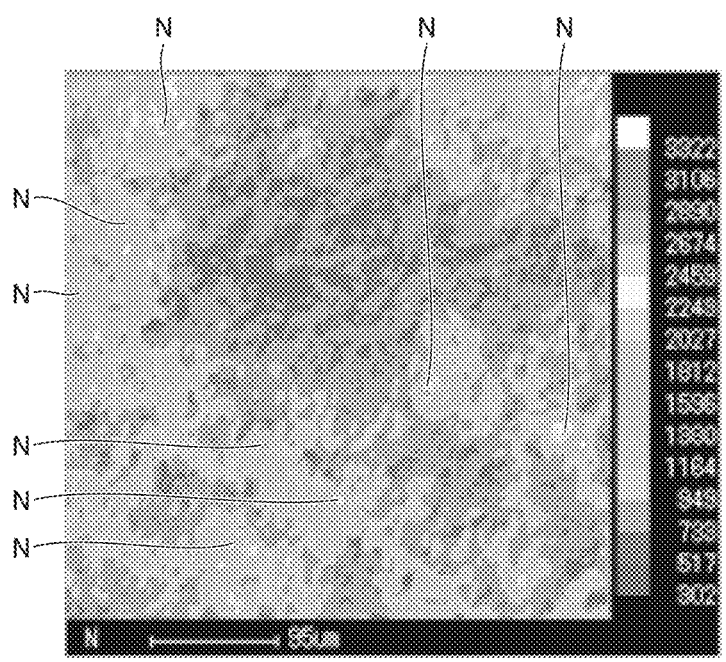
FIG. 9 represents the distribution of nitrogen at a specimen surface.
Figure 10:
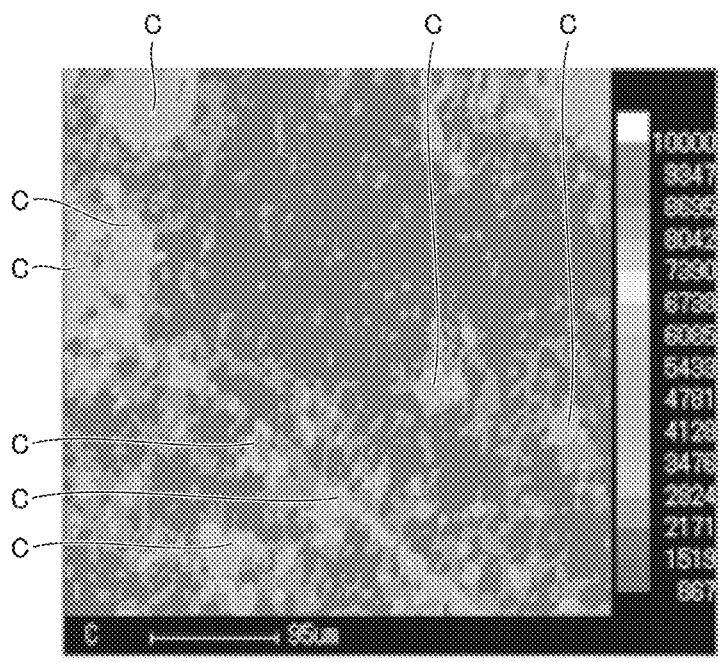
FIG. 10 represents the distribution of carbon at a specimen surface.

Further, a mapping analysis by EPMA (Electron Probe Micro Analysis) was performed on the surface of the test piece of steel A (AMS2315) after carburization. FIGS. 8, 9 and 10 represent the distribution of vanadium, nitrogen, and carbon, respectively.

Referring to FIGS. 8-10, vanadium was distributed at the surface of test piece subjected to carburization. This vanadium distribution corresponded to the distribution of carbon and nitrogen. Accordingly, it was confirmed that formation of a nitrogen-enriched layer is allowed in an RX gas atmosphere without having ammonia gas introduced via a film containing vanadium formed by oxidation (for example, a V film, a V—N film, a V—C film, a V—C—N film, or the like).

From the results set forth above, it was confirmed that formation of a film containing vanadium at the steel surface allows carbonitriding (formation of a nitrogen-enriched layer) to be realized without using ammonia gas.

In the method of manufacturing a machine component of the present invention, formation of a nitrogen-enriched layer at a higher temperature than that using ammonia is allowed. However, reduction of the mechanical property due to coarsening is a concern in steel treated at high temperature. Therefore, when formation of a nitrogen-enriched layer is carried out at high temperature in the method of manufacturing a machine component of the present invention, preferably secondary quenching is performed, by once cooling the machine component down to a temperature region less than or equal to $A_1$ transformation point after the formation of a nitrogen-enriched layer, heating again the machine component to a temperature region greater than or equal to $A_1$ transformation point, and then cooling down the machine component to a temperature less than or equal to $M_S$ point.

When a bearing component is to be manufactured by the method of manufacturing a machine component of the present invention, the nitrogen concentration at the surface layer is preferably set greater than or equal to 0.3 mass % from the standpoint of improving the wear resistance. As to the carbon concentration at the surface layer of the bearing component, sufficient surface hardness can be obtained by setting the carbon concentration greater than or equal to 0.6 mass %. If the carbon concentration at the surface layer of the bearing component exceeds 1.2 mass %, the mechanical property of the bearing component may be degraded by the generation of coarsened carbide. Therefore, the carbon concentration at the surface layer of the bearing component is preferably greater than or equal to 0.6 mass % and less than or equal to 1.2 mass %. Furthermore, since a bearing component is seldom used until the wear depth exceeds 0.1 mm, the thickness of the nitrogen-enriched layer should be greater than or equal to 0.1 mm.

Example 2

Experiments were carried out to examine the relation between the vanadium content in steel and the nitrogen concentration at the nitrogen-enriched layer, corresponding to the case of forming a nitrogen-enriched layer by subjecting a member made of steel containing vanadium to oxidation to form a film containing vanadium, and heating the same in a heat treatment gas atmosphere containing nitrogen gas and absent of ammonia gas. The experiment included the procedures set forth below.

First, a test piece of steel material JIS SUJ2, test pieces of steel material SUJ2 having 0.25 to 3.97 mass % vanadium added, and a test piece of steel material AMS (Aerospace Material Specification; USA) 6491 were prepared. The component composition of the steel material is shown in Table 2. In Table 2, the numeric values represent the content of C (carbon), Si (silicon), (Mn) manganese, Cr (chromium), Mo (molybdenum), and V (vanadium), respectively, and the residues are iron and impurities. The unit of the numeric values is mass %

TABLE 2

|  | C | Si | Mn | Cr | Mo | V |
|---|---|---|---|---|---|---|
| SUJ2 | 0.99 | 0.30 | 0.47 | 1.49 | — | — |
| SUJ2 + V0.25% | 0.99 | 0.31 | 0.47 | 1.50 | — | 0.25 |
| SUJ2 + V0.48% | 1.00 | 0.31 | 0.45 | 1.51 | — | 0.48 |
| SUJ2 + V0.77% | 1.00 | 0.31 | 0.47 | 1.50 | — | 0.77 |
| SUJ2 + V1.02% | 1.00 | 0.31 | 0.46 | 1.51 | — | 1.02 |

TABLE 2-continued

|  | C | Si | Mn | Cr | Mo | V |
|---|---|---|---|---|---|---|
| SUJ2 + V1.98% | 1.03 | 0.27 | 0.01 | 1.49 | — | 1.98 |
| SUJ2 + V3.97% | 1.00 | 0.31 | 0.01 | 1.52 | — | 3.97 |
| AMS6491 | 0.80 | <0.35 | <0.40 | 4.00 | 4.25 | 1.00 |

Following an oxidation process by heating the prepared test piece to a temperature greater than or equal 950° C. in the air, the test piece was heated to 960° C. in an RX gas atmosphere adjusted to have a carbon potential of 0.6 by adding enrich gas and absent of ammonia gas. Then, the nitrogen concentration at the surface of the test piece was examined by EPMA (Electron Probe Micro Analysis). The results of the examination are shown in FIG. 11.

Figure 11:
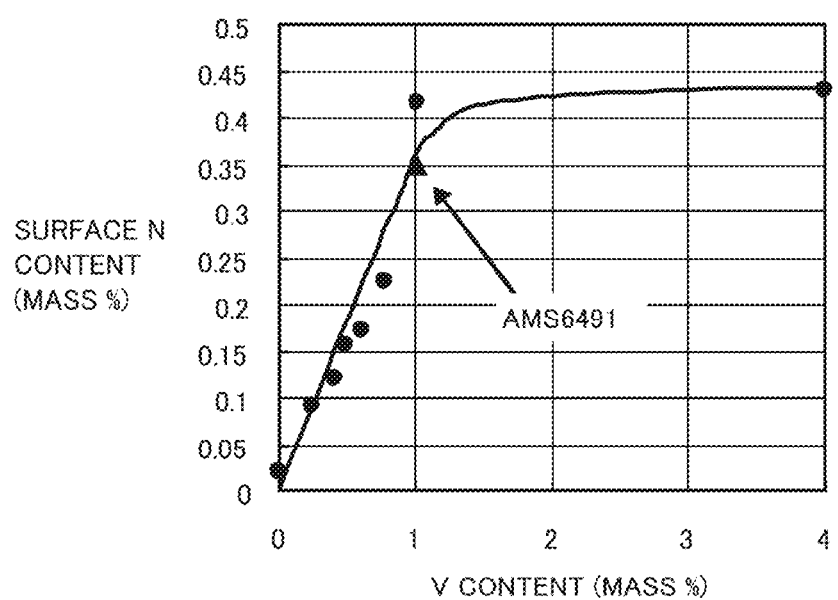
FIG. 11 represents the relationship between the vanadium content in the steel material and the surface nitrogen concentration.

In FIG. 11, the horizontal axis represents the vanadium content in the steel constituting the test piece, whereas the vertical axis represents the nitrogen concentration at the surface of the test piece. Referring to FIG. 11, a nitrogen content in the vicinity of 0.1 mass % was obtained at the surface of the test piece when the vanadium content in the steel was 0.25 mass %. The nitrogen content at the surface of the test piece increased as the vanadium content in steel, set greater than or equal to 0.25 mass %, became higher. However, the increase in the nitrogen content was saturated when the vanadium content in steel became approximately 1 mass %. It was appreciated that there is hardly no increase in the nitrogen content at the surface of the test piece even if vanadium greater than 1 mass % was added to steel. It can therefore be said that addition of vanadium exceeding 1 mass % has a small effect from the standpoint of increasing the nitrogen content at the surface. Therefore, the addition of vanadium is preferably less than or equal to 1% taking into account the increase in the steel material cost caused by addition of vanadium.

Example 3

Experiments were carried out to confirm formation of a nitrogen-enriched layer when using gas including nitrogen gas and hydrogen gas with residual impurities as the heat treatment gas. Among the test pieces provided in the experiment of Example 2 set forth above, test pieces having 1.02 mass % vanadium and 3.97 mass % vanadium added to SUJ2 were similarly prepared, and subjected to oxidation, likewise with Example 2. These test pieces were heat treated, i.e. heated to 960° C. in an atmosphere including 50 volume % of nitrogen gas and 50 volume % of hydrogen gas and maintained for 24 hours. Then, the nitrogen concentration distribution at the surface layer of the test piece was measured by EPMA. Furthermore, for a test piece made of steel material having 1.02 mass % vanadium added to SUJ2, the test piece was heat treated, i.e. heated to 960° C. in an atmosphere including 98 volume % of nitrogen gas and 2 volume % of hydrogen gas and maintained for 24 hours. The nitrogen concentration distribution at the surface layer was similarly measured. The results of the measurement are shown in FIGS. 12 and 13.

Figure 12:
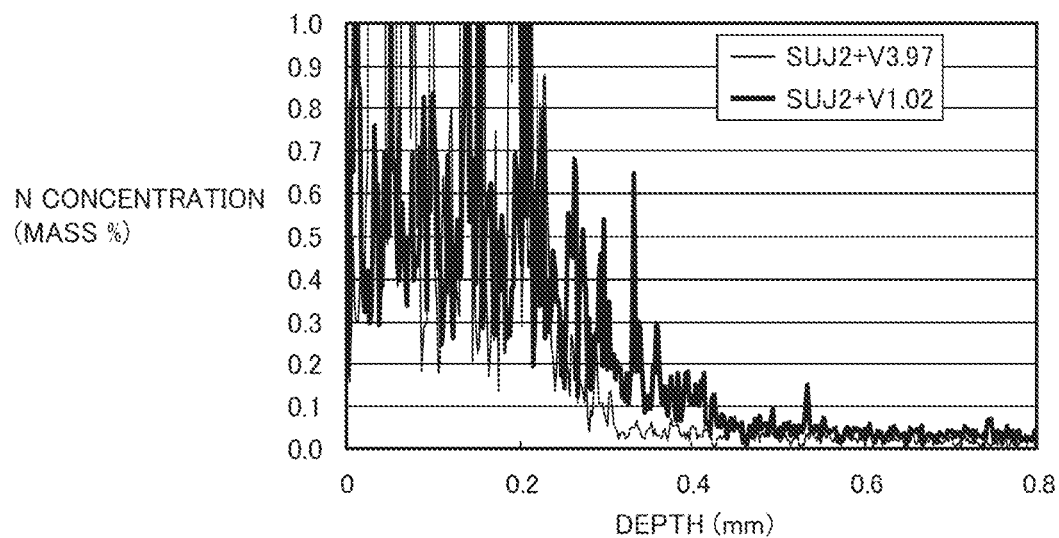
FIG. 12 represents the nitrogen concentration distribution at the surface layer.
Figure 13:
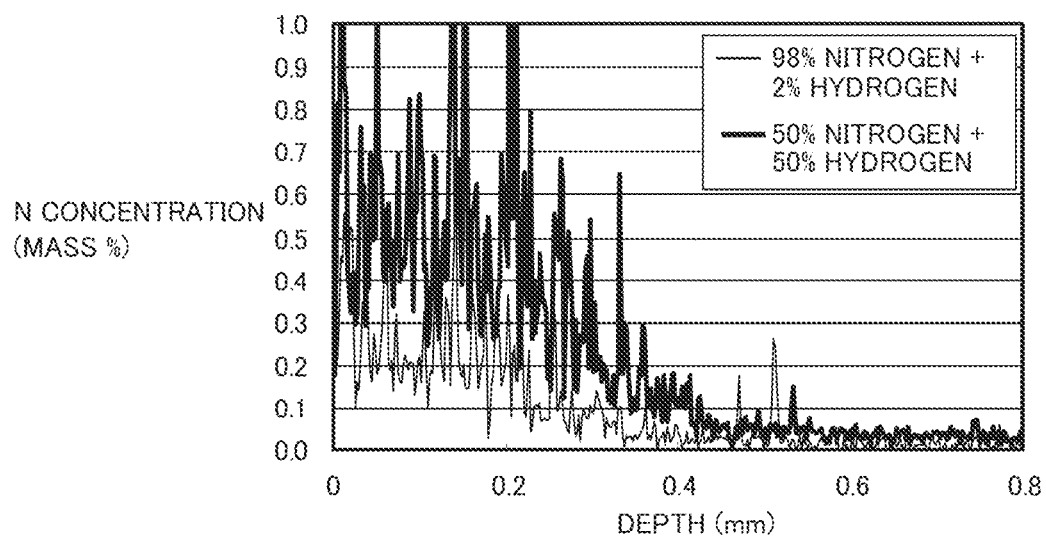
FIG. 13 represents the nitrogen concentration distribution at the surface layer.

In FIGS. 12 and 13, the horizontal axis represents the depth from the surface of the test piece, whereas the vertical axis represents the nitrogen concentration. In FIG. 12, the thin line corresponds to the test piece having 3.97 mass % vanadium added, whereas the bold line corresponds to the test piece having 1.02 mass % vanadium added. In FIG. 13, the thin line corresponds to the test piece heated in an atmosphere including 98 volume % of nitrogen gas and 2 volume % of hydrogen gas, whereas the bold line corresponds to the test piece heated in an atmosphere including 50 volume % of nitrogen gas and 50 volume % of hydrogen gas.

Referring to FIG. 12, it was confirmed that a nitrogen-enriched layer was definitely formed at the surface of the test piece in both the cases where the vanadium content in the steel material was 1.02 mass % and 3.97 mass %. Further, there was no distinct difference in the nitrogen concentration distribution at the surface layer between the test piece having the vanadium content in the steel material increased up to 3.97 mass % and the test piece having the vanadium content of 1.02 mass %. Therefore, as mentioned in Example 2, the addition of vanadium directed to formation of a nitrogen-enriched layer is sufficient at approximately 1%.

Comparing the test pieces in which the hydrogen concentration in the atmosphere corresponded to 50 volume % and 2 volume % in FIG. 13, there was a tendency that the nitrogen concentration became lower in the case of 2 volume % as compared to the case of 50 volume %. However, a nitrogen-enriched layer was definitely formed at the surface layer even in the case where the hydrogen concentration in the atmosphere was 2 volume %. It was therefore appreciated that the ratio of the hydrogen gas in the atmosphere can be reduced down to approximately 2 volume % in the case where the nitrogen concentration required at the surface layer is not so high.

It should be understood that the embodiments and examples disclosed herein are illustrative and non-restrictive in every respect. The scope of the present invention is defined by the terms of the claims, rather than the description above, and is intended to include any modification within the scope and meaning equivalent to the terms of the claims.

INDUSTRIAL APPLICABILITY

The method of manufacturing a machine component of the present invention is particularly applied advantageously to the method of manufacturing a machine component having a nitrogen-enriched layer at the surface layer.

invention claimed is:

1. A method of manufacturing a machine component comprising the steps of:
    preparing a member made of steel,
    forming a film containing vanadium at a surface of said member,
    forming a nitrogen-enriched layer by heating said member having said film formed in an atmosphere of heat treatment gas containing nitrogen gas and absent of ammonia gas, and
    quench-hardening said member by cooling said member having a nitrogen-enriched layer formed from a temperature greater than or equal to an eutectoid transformation start temperature down to a temperature less than or equal to a martensite start temperature.

2. The method of manufacturing a machine component according to claim 1, wherein said heat treatment gas has an oxygen partial pressure less than or equal to $10 \times 10^{-16}$ Pa.

3. The method of manufacturing a machine component according to claim 1, wherein said heat treatment gas includes reducing gas.

4. The method of manufacturing a machine component according to claim 3, wherein said heat treatment gas includes nitrogen gas and hydrogen gas with residual impurities.

5. The method of manufacturing a machine component according to claim 1, wherein in said step of preparing a member, a member made of steel is prepared containing vanadium greater than or equal to 0.1 mass %, in said step of forming a film, said film is formed by subjecting said member to oxidation.

6. The method of manufacturing a machine component according to claim 5, wherein, in said step of forming a film, said member is heated at a temperature range greater than or equal to 800° C. to be oxidized.

7. The method of manufacturing a machine component according to claim 5, wherein, in said step of forming a film, said member is forged.

8. The method of manufacturing a machine component according to claim 1, wherein said heat treatment gas includes endothermic converted gas.

9. The method of manufacturing a machine component according to claim 1, wherein said machine component includes a component constituting a rolling bearing.

\* \* \* \* \*